United States Patent

Idei et al.

[15] 3,670,184

[45] June 13, 1972

[54] LIGHT SENSITIVE AMPLIFIER CIRCUIT HAVING IMPROVED FEEDBACK ARRANGEMENT

[72] Inventors: Gijun Idei, Tokyo; Saburo Numata, Saitama-ken, both of Japan

[73] Assignees: Tokyo Shibaura Electric Co., Ltd., Kawasaki-shi; Fuji Shashin Kouki Kabushiki Kaisha, Saitama-ken, Japan

[22] Filed: Feb. 9, 1971

[21] Appl. No.: 113,979

[30] Foreign Application Priority Data

Feb. 13, 1970 Japan....................................45/11970
Feb. 13, 1970 Japan....................................45/11971
Feb. 18, 1970 Japan....................................45/13404

[52] U.S. Cl...............................307/311, 250/214 P, 307/304
[51] Int. Cl.........................................H03k 3/42, H01j 39/12
[58] Field of Search ..........................307/296, 297, 310, 251; 330/25; 95/10 CE; 250/214 P

[56] References Cited

UNITED STATES PATENTS 2,750,456 6/1966 Waldhauer ............................307/297
3,222,610 12/1965 Evans et al...............................330/25
3,005,958 10/1961 Grant...................................330/25 X

*Primary Examiner*—Donald D. Forrer
*Assistant Examiner*—B. P. Davis
*Attorney*—Flynn & Frishauf

[57] ABSTRACT

A light sensitive amplifier circuit arrangement for detecting light comprising a source follower field effect transistor having at least one resistor connected to its gate as well as between its source and ground; a second transistor whose base is connected to the field effect transistor, and whose collector is connected to a power source through a resistor; a constant voltage supply element connected between emitter of the second transistor and ground; a photocell connected in a negative feedback loop disposed between the gate of the field effect transistor and the output side of the second transistor; and a load connected to the output side of the second transistor and which driven in response to the variation of the resistance of the photocell due to the intensity of incident light. Further included is a negative feedback transmitting element from the output side of the second transistor to the grounded point of the resistor included in the source circuit of said field effect transistor. The resistor placed between the source of said field effect transistor and the grounded point may be a variable or semifixed type, there may be connected in parallel with the variable resistor a circuit including a first resistor, a heat sensitive resistor element and a second resistor all connected in series, the junction of the first resistor and the heat sensitive resistor element or second resistor is connected to the base of the second transistor. Still further, an additional resistor may be connected between the power source and either or both of the gate of said field effect transistor and the base of the second transistor.

13 Claims, 18 Drawing Figures

LIGHT SENSITIVE AMPLIFIER CIRCUIT HAVING IMPROVED FEEDBACK ARRANGEMENT

BACKGROUND OF THE INVENTION

The present invention relates to an amplifier arrangement for detecting light, and more particularly to improvements in an amplifier circuit arrangement adapted for adjustment of the diaphragm opening of the camera through which there is transmitted light.

The object of the present invention is to provide an amplifier circuit arrangement for regulating the amount of light received by a camera lens which enables the film always to receive a substantially constant amount of light to be exposed thereon, no matter how the incident light varies.

SUMMARY OF THE INVENTION

The circuit arrangement of the present invention includes means for causing the level of output signals to change generally in an approximately exponential function according to the varied amount of incident light, and means for minimizing the adverse effects of variations in the output voltage of a power supply. There is further provided feedback means for effecting improved temperature compensation over a broad range.

DESCRIPTION OF THE PREFERRED EMBODIMENTS

Figures 1, 2:
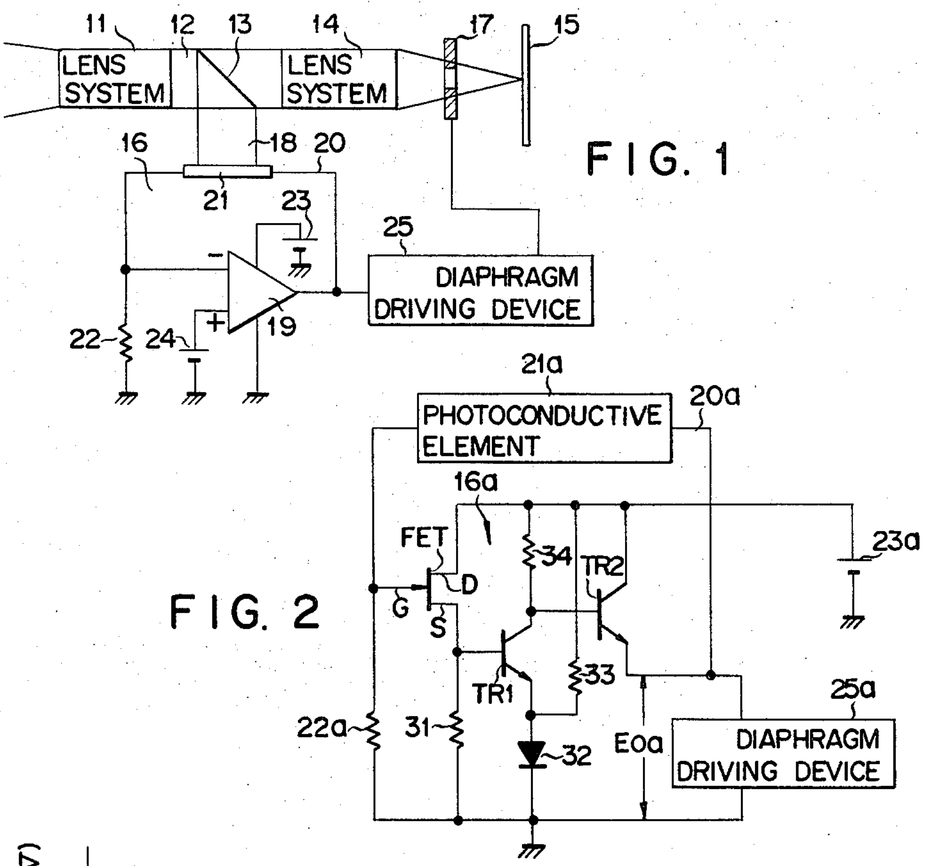
FIG. 1 is a block diagram showing a fundamental mechanism for adjusting the diaphragm of a camera.
FIG. 2 illustrates an amplifier circuit arrangement using a photoconductive element to adjust the diaphragm.

There will now be described amplifier circuit arrangements adapted for adjustment of the diaphragm of a camera so as to regulate the amount of light received by a camera lens, though not in the sense of limiting the scope of the invention. In general, a mechanism having a zoom lens system for adjusting the diaphragm of a camera has an arrangement illustrated in FIG. 1. Incident light 12 is introduced into the body of a camera through a zoom lens system 11 facing a foreground subject and projected on a film 15 through a half mirror 13 and a master lens system 14 to form the optical image of the foreground subject on the sensitive surface of the film 15.

In this case, to permit the film 15 always to receive a substantially constant amount of light to be exposed thereon regardless of the intensity of incident light, there is disposed in front of the film 15 a diaphragm 17 whose opening area is automatically adjusted according the intensity of incident light by an amplifier circuit 16 having the undermentioned arrangement adapted for such adjustment.

In said circuit arrangement 16, those beams 18 of incident light brought into the camera body in the aforementioned manner which are reflected by the half mirror 13 are projected on the light receiving surface of a photocell 21 such as a $S_e$ photocell, $S_i$ photocell, photo conductive element, or photo transistor connected in series to a negative feedback loop 20 disposed between one of the input terminals and the output terminal of an operational (or comparison) amplifier 19. For convenience of description the term "photocell" used hereinafter represents a photoconductive element. Said one input terminal is connected through a resistor 22 having a proper degree of resistance to either the positive or negative terminal of a power supply 23, for example, the grounded negative terminal thereof. The other input terminal of the amplifier 19 is grounded through a reference voltage source 24 having substantially constant voltage. To the output terminal of the amplifier 19 is connected a diaphragm driving device 25 consisting of a load for automatically adjusting the opening of the diaphragm 17 according to the magnitude of the output from amplifier 19, for example, a movable coil type ammeter or motor.

If the degree of amplification of said operational amplifier 19 is designated as A, the voltage impressed on said one input terminal thereof as $E_i$ and the voltage of the reference voltage source 24 as $E_s$, then the output voltage $E_o$ from the amplifier 19 may be expressed as $$E_o = -A \cdot (E_i - E_s) \quad (1)$$

With the resistance of the resistor 22 represented by R and the resistance of the photoconductive element 21 by $R_p$, then said input terminal voltage $E_i$ may be expressed as $$E_i = E_o \cdot (R/R + R_p)$$

From the equations (1) and (2) is derived a relationship.

$$E_s = \left(\frac{R}{R+R_p} + \frac{1}{A}\right) \cdot E_o. \quad (2)$$

If, therefore, said operational operation amplifier 19 carries out sufficient amplification, then there results $$E_o \doteqdot \frac{R+R_p}{R} \cdot E_s \quad (3)$$

Assuming, therefore, that said amplifier 19 performs full amplification and the voltage $E_s$ of the reference voltage source 24 is kept substantially constant, then the output voltage $E_o$ of said amplifier 19 is determined only by the resistance $R$ (fixed value) of the resistor 22 and the resistance $R_p$ of the photoconductive element 21. The resistance $R_p$ of the element 21 decreases with increasing amounts of light coming to the camera body. As a result, the output voltage $E_o$ from the amplifier 19 decreases with increasing amounts of incident light 21, reducing the opening area of the diaphragm 17 by means of the diaphragm driving device 25 thereby to cause a substantially constant quantity of light to be exposed on the film 15. In this case it is important that the photoconductive element 21 be connected as shown in FIG. 1. If contact between said element 21 and the resistor 22 is reversed, then there will undesirably occur prominent variations in the output voltage $E_o$ from the amplifier 19 due to external causes such as changes in the voltage of the power supply 23. With the open circuit gain of said amplifier 19 denoted as $A_o$, variations in the output voltage $E_o$ therefrom due to such external changes may be expressed as $(1 + R_p/R) / A_o$ in the circuit of FIG. 1, whereas, if said element 21 is connected to the resistor 22 in reverse relationship, said variations in the output voltage will be $(1 + R/R_p) / A_o$. This means that if the photoconductive element 21 is reduced in resistance $R_p$, then such variations in the output voltage will become more prominent than in the case of the circuit arrangement of FIG. 1. From the standpoint of response speed, it is preferred that the photoconductive element be used with a highest possible resistance of, for example, several to 300 MΩ.

To fully meet the relationship represented by the above Equation (3), the amplifier 19 should preferably consist of an active circuit element having as high an input impedance as possible such as, a field effect transistor.

The research work and experiments of the present inventors show that there may be cited the following three items as the major conditions demanded of the aforementioned amplifier circuit arrangement.

1. The amount of light brought into the camera body and the opening area of the diaphragm should have such a relationship that when there are introduced small amounts of light, said opening area should be varied to a correspondingly large extent and vice versa.

Therefore, the output voltage from said amplifier circuit arrangement 16 should change in an approximately exponential function according to variations in the amount of incident light.

2. Even when ambient temperature changes, the output voltage $E_o$ from said circuit arrangement 16 should be least affected thereby.
3. Even when supply voltage changes, the output voltage $E_o$ from said amplifier circuit arrangement 16 should be least affected thereby. The above-listed conditions are particularly important, because a power supply for driving a camera generally consists of a dry cell.

FIG. 2 illustrates an amplifier circuit arrangement 16a for adjusting the diaphragm of a camera. According to this circuit arrangement, there is used in a source follower circuit a field effect transistor (hereinafter referred to as an "FET") whose drain D is directly connected to the positive terminal of a power supply 23a having its negative terminal grounded. The gate G of the FET is grounded through a resistor 22a and the source S thereof is grounded through a resistor 31. Said source S is also connected to the base of a transistor $TR_1$ whose emitter is grounded through a reference voltage source, for example, a diode 32 connected in the forward direction and further connected to the positive terminal of the power supply 23a through a resistor 33, and whose collector is connected to the positive terminal of the power supply 23a through a resistor 34. To the collector of said transistor $TR_1$ is connected the base of a transistor $TR_2$ whose collector is directly connected to the positive terminal of the power supply 23a. There is connected a photoconductive element 21a to a negative feedback loop 20a disposed between the emitter of the latter transistor $TR_2$ and the gate G of the FET. Between the emitter of the transistor $TR_2$ and the ground is connected a diaphragm driving device 25a. Referring to said amplifier circuit arrangement 16a, if the voltage across the gate G and source S of the FET is designated as $E_{GS}$, the voltage across the base and emitter of the transistor $TR_1$ as $E_{BE}$ and the forward bias voltage of the diode 32 as $E_F$, then a reference voltage $E_{sa}$ corresponding to the first mentioned reference voltage $E_s$ may be expressed as $$E_{sa} = E_{BE} + E_F - E_{GS} \qquad (4)$$

Since the transistor $TR_1$ acts as a phase inverting amplifier, the phase of voltage across the gate G of the FET to which there is connected the photoconductive element 21a and the emitter of the transistor $TR_2$ is always inverted to form a negative feedback loop 20a. A circuit including the FET, and transistors $TR_1$ and $TR_2$ constitutes an operational amplifier 19a. It will be apparent, therefore, that the amplifier circuit arrangement 16a of FIG. 2 has an equivalent arrangement and operation to that of FIG. 1.

Figure 3:
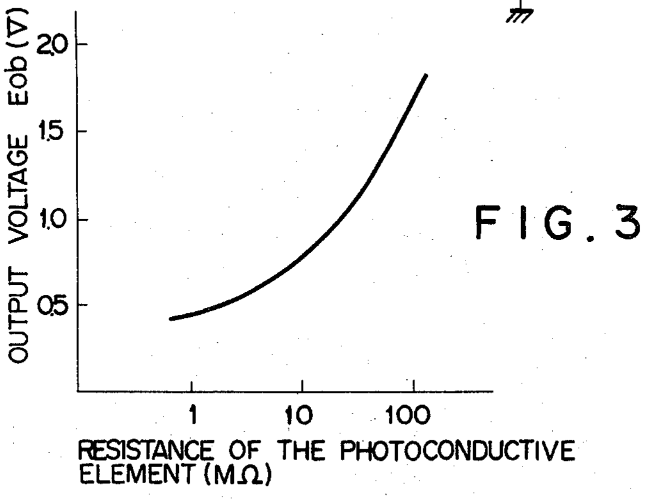
FIG. 3 is a graph indicating the relationship between the output voltage from the circuit arrangement of FIG. 2 and the resistance of a photoconductive element.

With the circuit arrangement 16a of FIG. 2, however, the resistance $R_p$ of the photoconductive element 21a and output voltage $E_o$ from the circuit arrangement 16a are in a linear relationship as shown by the Equation (3). With an ordinary photoconductive element, its resistance and the amount of light received by a film have a substantially constant relationship, rendering said amount of light approximately proportionate to the output voltage $E_o$. Accordingly, as shown in FIG. 3, where there are brought in small amounts of light, the opening of the diaphragm is varied by only small amounts, resulting in the occurrence of errors in the exact amount of light to be received by a film in case the incident light changes in quantity.

Figures 4, 5, 6:
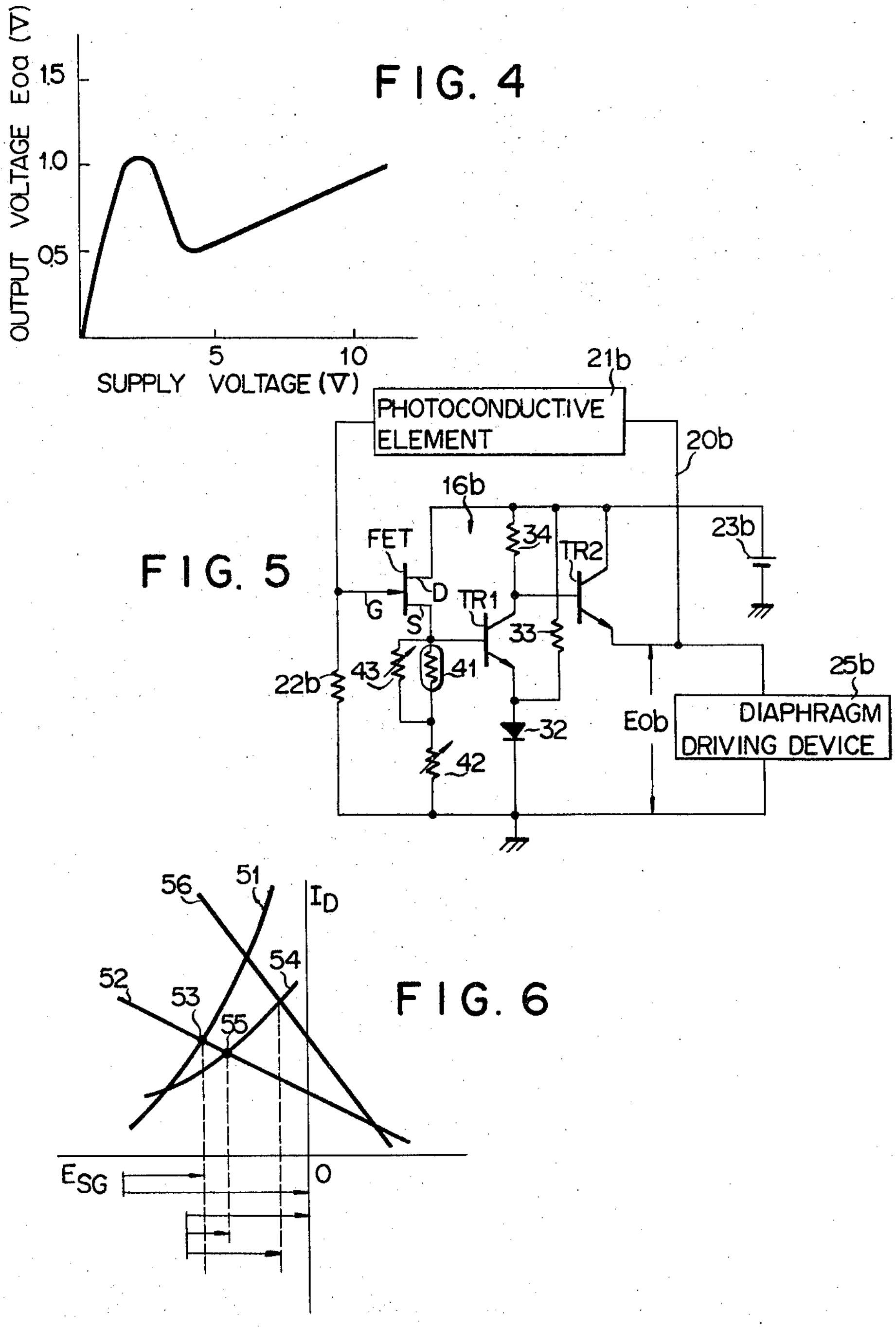
FIG. 4 is a graph showing the relationship between the output voltage from the circuit arrangement of FIG. 2 and the source voltage.
FIG. 5 illustrates another amplifier circuit arrangement for adjusting the diaphragm.
FIG. 6 is a graph denoting those characteristics of a field effect transistor used in the circuit arrangements of FIGS. 2 and 5 which are associated with the relationship of voltage across its gate and source versus its drain current $I_D$ as well as with the load line of a resistor connected between its source and ground.

Further, if, in the circuit arrangement 16a of FIG. 2, there occur variations in the power supply 23a, its output voltage $E_o$ will change as illustrated in FIG. 4. Accordingly, there is the disadvantage that the amounts of light to be exposed on the film 15 change just as the voltage of the power supply itself varied.

With the circuit arrangement 16a of FIG. 2, variations in its output voltage $E_{oa}$ due to changes in ambient temperature are obviously caused mostly by variations in $E_{sa}$ of the above Equation (4) resulting from said temperature change. The voltages $E_{BE}$, $E_F$ and $E_{GS}$ of the Equation (4) equally vary in the same direction with respect to changes in ambient temperature. Assuming, therefore, that said voltages $E_{BE}$, $E_F$ and $E_{GS}$ respectively vary about 2 mV/°C. due to temperature change, then the voltage $E_{sa}$, that is, $E_{oa}$ will always similarly vary about 2 mV/°C. in the aggregate. Therefore the above described circuit arrangement have the shortcoming that the amounts of light to be exposed on the film 15 varies with various variations in ambient temperature.

FIG. 5 shows another amplifier circuit arrangement 16b for adjustment of the diaphragm of a camera so designed as to minimize variations in output voltage resulting from variations in ambient temperature. In this circuit arrangement 16b, the resistor 31 included in the circuit arrangement of FIG. 2 is replaced by a heat sensitive element 41, for example, a thermister or diode and variable resistor 42 connected in series between the source S of the FET and the ground and a resistor 43 connected in parallel with said heat sensitive element 41.

Referring to FIG 6, there will now be described the operation of said amplifier circuit arrangement 16b of FIG. 5 in comparison with that of FIG. 2 by reference to the relationship of the voltage $E_{GS}$ across the gate and source of the FET versus the drain current $I_D$ of the FET and the load line characteristics of the resistor connected between the source of the FET and the ground.

Let it be assumed that the FET presents such $E_{GS} - I_D$ characteristics as are represented by the curve 51 at a given temperature and the resistor connected between the source S of the FET and the ground (the circuit arrangement of FIG. 2 only includes tee resistor 31, while that of FIG. 5 includes the heat sensitive element 41 and the two variable resistors 42 and 43) displays load line characteristics indicated by the curve 52. Then the operating point of the circuit arrangement of FIG. 5 is defined by the voltage $E_{so}$ (corresponding to the voltage $E_{sa}$ of the above Equation (4) which is determined by the intersection 53 of said curves 51 and 52. If, under such condition, ambient temperature rises, there will occur a decline not only in the voltage $E_{EB}$ across the base and emitter of the transistor $TR_1$ but also the forward bias voltage $E_F$ of the diode 32. And the FET will exhibit such $E_{GS} - I_D$ characteristics as shown by the curve 54.

Thus in the circuit arrangement of FIG. 2, the intersection of the curves 52 and 54 shifts from the previous points 53 to 55. And the voltages corresponding to $E_{BE}$, $E_F$ and $E_{GS}$ of the Equation (4) vary with temperature substantially equally in the same direction (because a decrease in $(E_{BE}+E_F)$ cannot be compensated by an increase in $E_{GS}$), so that the output voltage $E_{oa}$ from said circuit arrangement will prominently vary with ambient temperature, as illustrated by the curve 54 of FIG. 7. Conversely in the circuit arrangement of FIG. 5, the resistance of the heat sensitive element 41 is properly selected and the resistances of both variable resistors 42 and 43 are suitably regulated according to change in ambient temperature. Where, therefore, ambient temperature changes as described above, the resistance of the heat sensitive element 41 decreases to reduce the voltage across the source and gate of the FET to a greater extent than in the case of FIG. 2, permitting compensation for a decline in $(E_{BE}+E_F)$.

Figure 7:
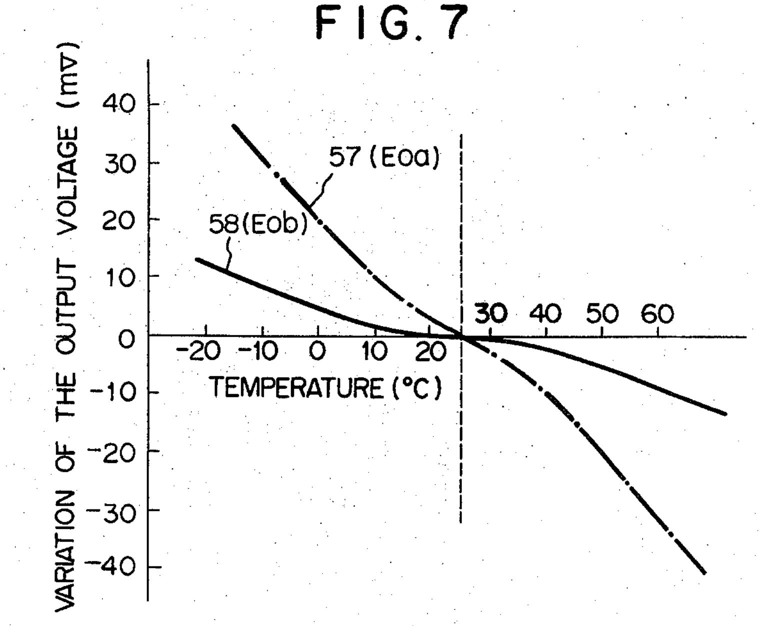
FIG. 7 is a graph presenting the characteristics of the circuit arrangements of FIGS. 2 and 5 associated with the relationship of output voltage versus ambient temperature.

If, therefore the overall load line characteristics of the resistors 41, 42 and 43 connected between the source of the FET and the ground are set as denoted by the curve 56 of FIG. 5, then variation in the output voltage $E_{ob}$ with ambient temperature will be more noticeably reduced than in the circuit arrangement of FIG. 2 as shown by the curve 58 of FIG. 7.

In the circuit arrangement of FIG. 5, however, the resistances of the two variable resistors 42 and 43 must be adjusted at the same time so as to meet the property of the FET used. Therefore, the circuit arrangement of FIG. 5 has the drawbacks that it is not only difficult to determine an optimum value of resistance for these resistors, but also temperature compensation by their combination can only be effected within a certain narrow range of $I_{DSS}$ of the FET, because said combination must be varied with the characteristics of the FET relative to temperature and zero bias drain current $I_{DSS}$.

Figure 8:
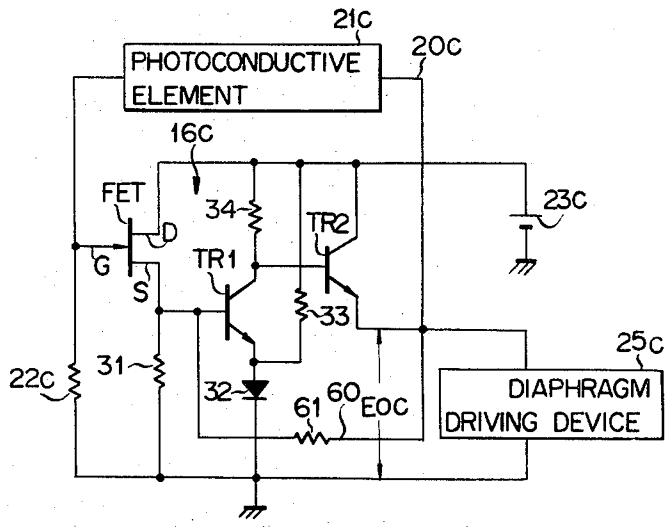
FIG. 8 illustrates an amplifier circuit arrangement according to an embodiment of the present invention for adjusting the amount of incoming light.

FIG. 8 shows an amplifier circuit arrangement according to an embodiment of the present invention for adjusting the amount of incident light, the circuit being so designed as to cause its output volt age to change in an approximately exponential function with the amount of incident light. Between the base of the transistor $TR_1$ and the emitter of the transistor $TR_2$ is connected a proper feedback transmitting element, for example, a resistor 61 so as to form the entire circuit arrangement into an exponential function type.

Figure 9:
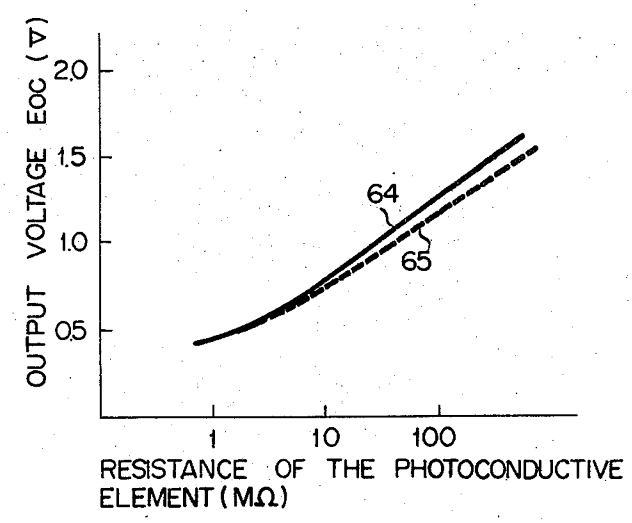
FIG. 9 is a curve diagram showing the relationship of output voltage from the circuit of FIG. 8 versus the resistance of a light receiving element.

According to such a circuit arrangement, while a photocell, for example, a photoconductive element 21*c* as described in FIG. 1 is supplied with relatively small amount of incident light, the element 21*c* has a relatively high resistance, so that output voltage $E_{oc}$ from the emitter of the transistor $TR_2$ is negatively fed back through a loop 60 including the resistor 61 substantially without being negatively fed back to a loop 20*c* including the photoconductive element 21*c*. On the other hand, increasing amounts of incident light supplied to the photoconductive element 21*c* cause its resistance to decrease accordingly, resulting in the negative feedback of larger output voltage $E_{oc}$ through the negative feedback loop 20*c* including said element 21*c*. Accordingly, the output voltage $E_{oc}$ from the emitter of the transistor $TR_2$ changes in an approximately exponential function as indicated by a dotted curve 65 approximating an ideal solid curve 64 given in FIG. 9 according to the varied resistance of the photoconductive element 21*c*. If, therefore, the opening area of the diaphragm 17 of FIG. 1 is regulated by a driving device 25*c* therefor connected to the emitter of the transistor $TR_2$, then there can always be controlled within a smaller range of errors the amount of light received by the film with respect to the varied amount of incident light than is possible with the circuit arrangements of FIGS. 2 and 5.

Figure 10:
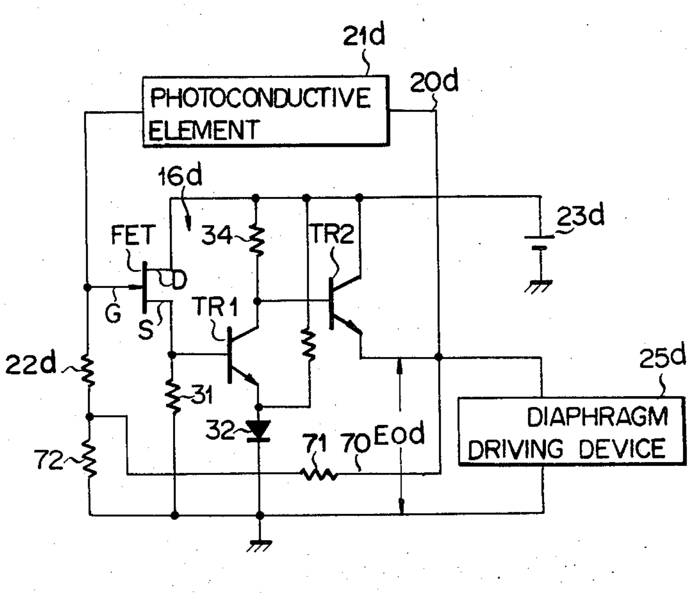
FIG. 10 illustrates an amplifier circuit arrangement according to another embodiment of the invention for adjusting the amount of incoming light.

FIG. 10 is a diagram of an amplifier circuit arrangement 16*d* according to another embodiment of the invention wherein there is disposed a negative feedback loop 70 including resistors 71 and 72 at the grounded point of a resistor 22d included in the gate circuit of the FET, thereby enabling a photoconductive element 21*d* to carry out negative feedback even by, for example, a silicon photodiode or silicon photocell having constant current characteristics. Obviously, such an amplifier circuit arrangement acts as an exponential function type substantially in the same manner as that of FIG. 8, and has the advantage of minimizing variations in the operating condition of the FET and allowing the resistor 71 connected between the emitter of the transistor $TR_2$ and the juncture of the serial connected resistors 22*d* and 72 to have a relatively low resistance, and further the photocell to be formed of a silicon photodiode or silicon photocell having constant current characteristics.

Figures 11, 12, 13:
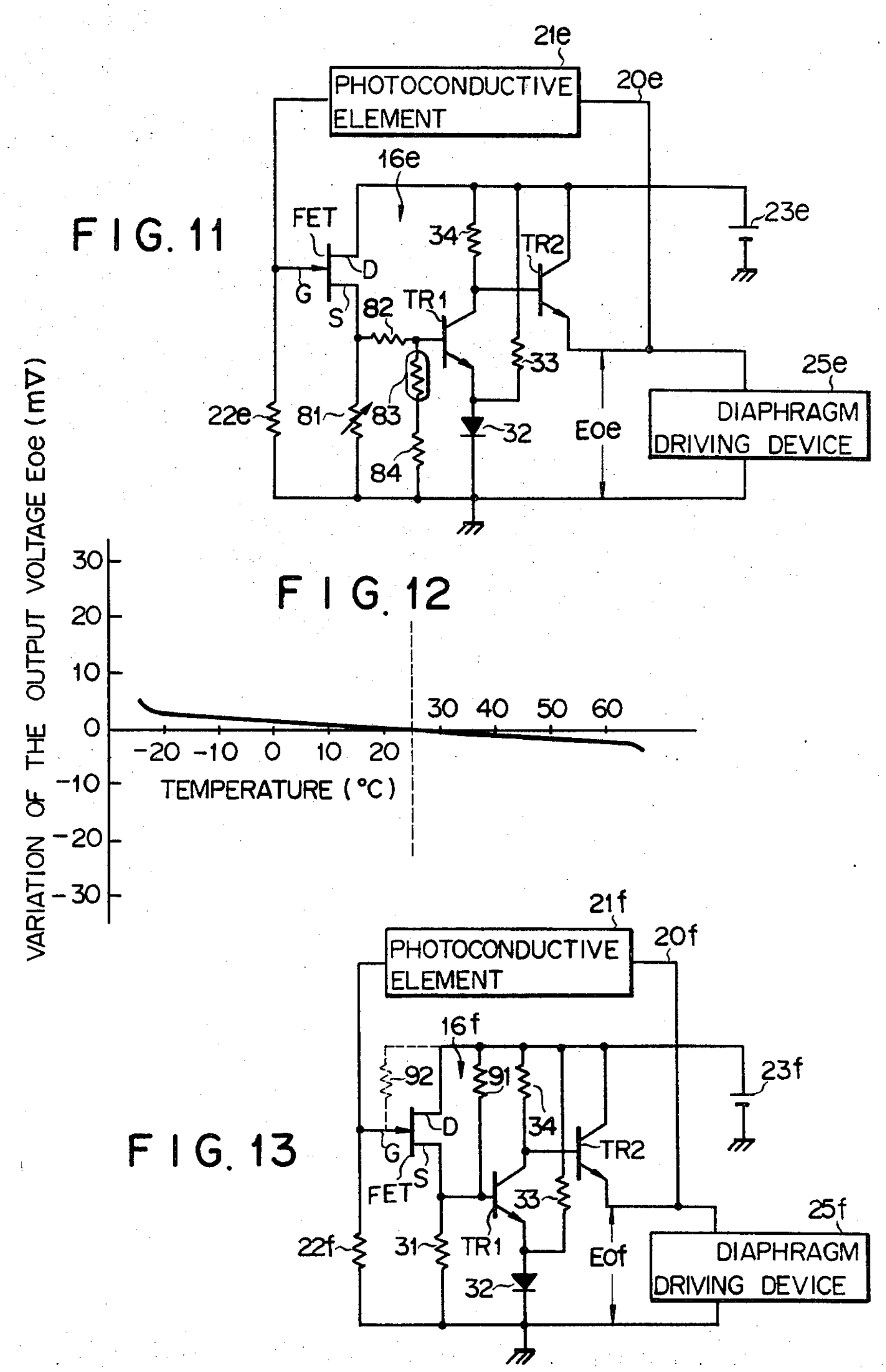
FIG. 11 illustrates an amplifier circuit arrangement according to still another embodiment of the invention for adjusting the amount of incoming light.
FIG. 12 is a graph indicating the relationship of output voltage from the circuit arrangement of FIG. 11 versus ambient temperature.
FIG. 13 illustrates an amplifier circuit arrangement according to a further embodiment of the invention for adjusting the amount of incoming light.

FIG. 11 represents an amplifier circuit arrangement 16*e* according to still another embodiment of the invention for regulating the amount of incident light to be received by a film, which is so designed as to have its output voltage little affected by variations in ambient temperature. Between the source S of the FET and the grounded point are disposed in parallel a circuit consisting of a variable resistor or permissibly semifixed resistor 81 and a circuit including a resistor 82, heat sensitive element 83 and resistor 84 connected in series. The junction of the resistor 82 and heat sensitive element 83 is connected to the base of the transistor $TR_1$. Said heat sensitive element 83 and resistor 84 may be interchanged with respect to the junction point.

In the circuit arrangement of FIG. 11, with the resistance of the heat sensitive element 83 designated as $R_{th}$, and the resistances of the resistors 82 and 84 as $R_{82}$ and $R_{84}$ respectively, a voltage $E_{se}$ corresponding to the referential source voltage $E_{sa}$ of the previously given Equation (4) may be expressed as follows:

$$E_{se} \doteqdot \left(1+\frac{R_{82}}{R_{th}+R_{84}}\right)(E_{BE}+E_F)-E_{GS} \qquad (5)$$

Upon a rise in ambient temperature, the resistance $R_{th}$ of the heat sensitive element 83 drops to cause the term $$\left(1+\frac{R_{82}}{R_{th}+R_{84}}\right)$$

to have an increased value, thereby positively compensating a decline in the sum of the voltages $E_{BE}$ and $E_F$ included in the Equation (4). The aforementioned increased ambient temperature also results in a decrease in the overall resistance of the parallel circuitry formed of the circuit of the variable resistor 81 and the circuit including the resistor 82, heat sensitive element 83 and resistor 84 connected in series. Accordingly, temperature compensation can also be effected by the varied resistance of the source circuit of the FET.

For full temperature compensation, the larger the zero bias drain current $I_{DSS}$, the smaller should be variations in the resistance of the source circuit of the FET resulting from changes in ambient temperature. Further with an FET having a large value of $I_{DSS}$, the variable resistor 81 should be as much reduced in resistance as possible in order to keep constant the voltage $E_{se}$. This arises from the necessity of minimizing an effect from the varied resistance of the heat sensitive element 83 due to changes in ambient temperature, thereby automatically reducing variations in the resistance of the source circuit of the FET caused by said changes. If, therefore, the resistances of the resistors 82 and 84 are properly selected, then a single variable resistor 81 will be sufficient to permit temperature compensation by an FET having a larger value of $I_{DSS}$ than that used in the circuit arrangement of FIG. 5.

For example, where there were used a eat sensitive element 83 having a resistance of 2.5 KΩ at 25° C., a resistor 82 having a resistance of 60Ω, a resistance of 1.8 KΩ and an FET whose $I_{DSS}$ value ranges from 2 to 5 mA, then there was realized good temperature compensation wherein the output voltage $E_{oe}$ displayed as small variations as ± 10 $m^V$ over an ambient temperature range between −20° and +50° C. as shown in FIG. 12.

Where the amplifier circuit arrangement 16e of FIG. 11 for adjusting the amount of incident light to be received by a film is formed into an integrated type, the $I_{DSS}$ of the FET included in said circuit arrangement will be allowed to have a broader range of variation, enabling said circuit arrangement to be fabricated with a better yield of usable circuits.

FIG. 13 is a diagram of an amplifier circuit arrangement 16f according to a further embodiment of the present invention for regulating the amount of incident light to be received by a film wherein to compensate variations in the voltage of a power source 23f, there is connected a resistor 91 between the positive terminal of the source 23f and the base of the transistor $TR_1$.

Figures 14, 15:
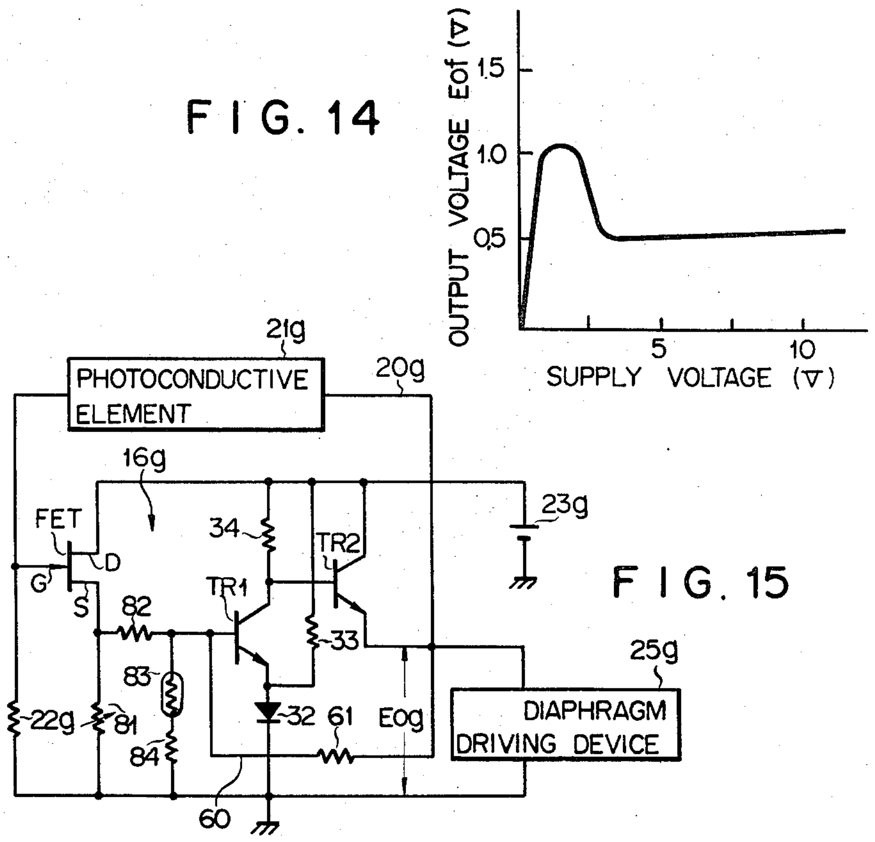
FIG. 14 is a graph illustrating the relationship of output voltage from the circuit arrangement of FIG. 13 versus the voltage of the driving power source.
FIGS. 15 to 18 show amplifier circuit arrangements according to still other embodiments of the invention for adjusting the amount of incoming light.

With such a circuit arrangement, a rise in the voltage of the source 23f will lead through the resistor 91 to an increase in the base current and a decrease in the collector voltage of said transistor $TR_1$, so that variations in output voltage $E_{of}$ due to changes in the supply voltage can be more prominently reduced, as shown by the curve of FIG. 14, than any other of the circuit arrangements described above.

If, in this case, there is connected in place of the resistor 91 a similar resistor 92 between the positive terminal of the power source 23f and the gate G of the FET, the same result will obviously be obtained. It is also possible to use both resistors 91 and 92.

FIG. 15 shows an amplifier circuit arrangement 16g formed of a combination of the circuit arrangements of FIGS. 8 (or permissibly 10) and 11 according to a still further embodiment of the present invention so as to regulate the amount of incident light to be received by a film, the circuit being so designed as to cause its output voltage $E_{og}$ to vary in an approximately exponential function with respect to broad changes in the amount of the incident light and also effectively compensate for variations in ambient temprature.

Figure 16:
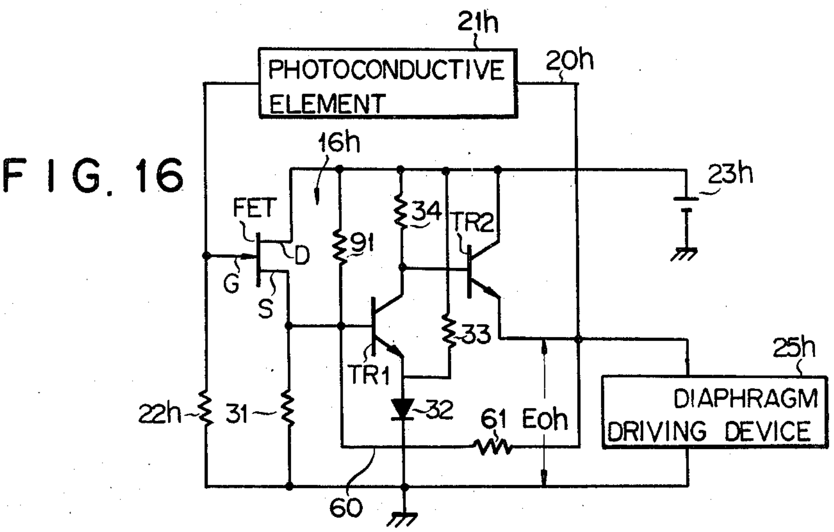

FIG. 16 illustrates an amplifier circuit arrangement 16h formed of a combination of the circuit arrangements of FIGS. 8 (or permissibly 10) and 13 according to a still further embodiment of the invention os as to regulate the amount of incident light to be received by a film, which circuit is so designed as to cause its output volt age $E_{oh}$ to vary in ideal exponential function with respect to broad variations in the amount of said incident light and also to suppress variations in said output voltage $E_{oh}$ resulting from changes in the voltage of a power source 23h.

Figure 17:
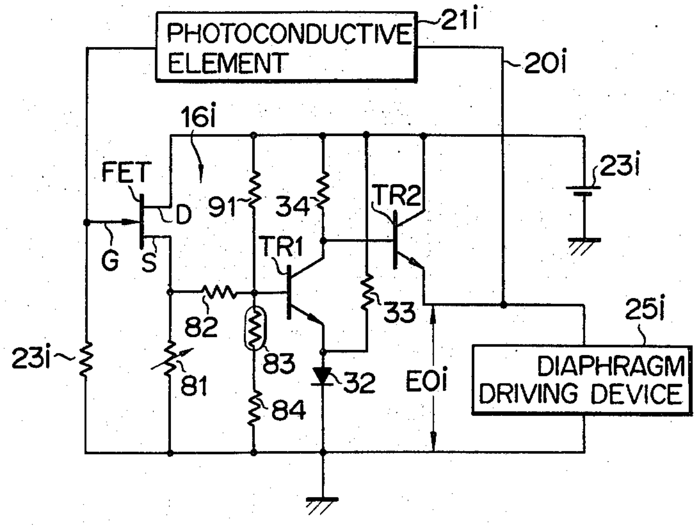

FIG. 17 illustrates an amplifier circuit arrangement 16i comprising a combination of the circuit arrangements of FIGS. 11 and 13 according to a still further embodiment of the invention so as to regulate the amount incident light to be received by a film, which circuit is so designed as to restrict variations in its output voltage $E_{oi}$ due to changes in not only ambient temperature but also the voltage of a power source 23i.

Figure 18:
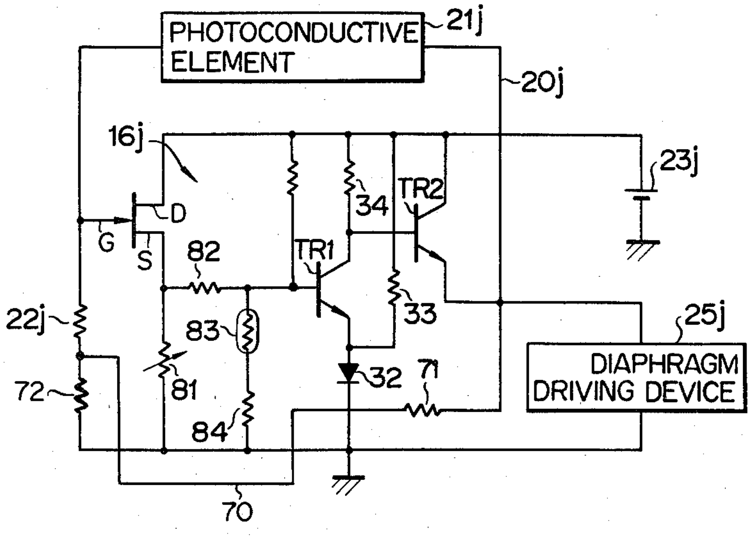

FIG. 18 indicates an amplifier circuit arrangement 16j composed of a combination of the circuit arrangements of FIGS. 10, 11 and 13 so as to regulate the amount of incident light to be received by a film, which circuit is so designed as to cause its output voltage $E_{oj}$ to vary an approximately exponential function with respect to broad changes in the amount of said incident light and also to effect compensation for variations in not only ambient temperature but also the voltage of a power source 23j. It will be apparent from the previous description that the amplifier circuit arrangement of FIG. 18 always permits a most ideal regulation of light quantity to which a film is to be exposed under any environmental conditions.

The same parts of FIGS. 2, 5, 8, 10, 11, 13 and 15 to 18 as those of FIG. 1 are denoted by corresponding numerals and description thereof is omitted. The foregoing embodiments relate to the use of a photoconductive element as a photocell. However, substitution of a $S_e$ or $S_i$ photocell or phototransistor therefor gives the same result. Further, unless the operation of a diaphragm requires large power, the transistor $TR_2$ may be eliminated. Conversely where said operation needs large power, there may be provided another transistor in addition to the transistor $TR_2$. The FET may consist of not only a junction type but also an insulation gate type, provided it has high input impedance.

What we claim is:

1. A light sensitive amplifier circuit arrangement for detecting light comprising:

a source follower field effect transistor having at least a gate resistor coupled between its gate and ground, and a source resistor coupled between its source and ground;

a second transistor whose base is connected to the source of said field effect transistor, and whose collector is connected to a power source through a resistor;

a constant voltage supply element connected between the emitter of said second transistor and ground;

a photoconductive element connected in a negative feedback loop disposed between the gate of said field effect transistor and the output side of said second transistor;

a load coupled to the output side of said second transistor and which is driven in response to the variation of the resistance of the photoconductive element due to the intensity of incident light; and a feedback transmitting element coupled in a negative feedback loop disposed between the output side and the base of said second transistor.

2. A light sensitive amplifier circuit arrangement according to claim 1 wherein said source resistor coupled between the source of said field effect transistor and ground comprises a variable resistance, and including a circuit coupled in parallel with said source resistor, said circuit including a first resistor, a heat sensitive resistance element and a second resistor all connected in series, the junction of said first resistor and at least one of said heat sensitive resistance element and second resistor being connected to the base of said second transistor.

3. A light sensitive amplifier circuit arrangement according to claim 1 including a further amplifier stage coupled to the output terminal of said second transistor.

4. A light sensitive amplifier circuit arrangement for detecting light comprising:

a source follower field effect transistor having at least a gate resistor coupled between its gate and ground, and a source resistor coupled between its source and ground;

a second transistor whose base is connected to the source of said field effect transistor, and whose collector is connected to a power source through a resistor;

a constant voltage supply element connected between the emitter of said second transistor and ground;

a photoconductive element connected in a negative feedback loop disposed between the gate of said field effect transistor and the output side of said second transistor;

a load coupled to the output side of said second transistor and which is driven in response to the variation of the resistance of the photoconductive element due to the intensity of incident light; and a feedback transmitting element coupled in a negative feedback loop through a resistor, said feedback transmitting element being coupled between the output side of said second transistor and ground through a resistor included in the source circuit of said field effect transistor.

5. A light sensitive amplifier circuit arrangement for detecting light comprising:

a source follower field effect transistor having at least a gate resistor coupled between its gate and ground, and a source resistor coupled between its source and ground;

a second transistor whose base is connected to the source of said field effect transistor, and whose collector is connected to a power source through a resistor;

a constant voltage supply element connected between the emitter of said second transistor and ground;

a photoconductive element connected in a negative feedback loop disposed between the gate of said field effect transistor and the output side of said second transistor;

a load coupled to the output side of said second transistor and which is driven in response to the variation of the resistance of the photoconductive element due to the intensity of incident light; and at least one further resistor coupled between the power source and at least one of tee gate of said field effect transistor and the base of said second transistor.

6. A light sensitive amplifier circuit arrangement according to claim 5 including a first further resistor is coupled between said power source and said gate of said field effect transistor, and a second further transistor coupled between said power source and said base of said second transistor.

7. A light sensitive amplifier circuit arrangement for detecting light comprising:

a source follower field effect transistor having at least a gate resistor coupled between its gate and ground, and variable source resistor coupled between its source and ground;

a second transistor whose base is connected to the source of said field effect transistor, and whose collector is connected to a power source through a resistor;

a constant voltage supply element connected between the emitter of said second transistor and ground;

a photoconductive element connected in a negative feedback loop disposed between the gate of said field effect transistor and the output side of said second transistor;

a load coupled to the output side of said second transistor and which is driven in response to the variation of the resistance of the photoconductive element due to the intensity of incident light;

a feedback transmitting element coupled in a negative feedback loop disposed between the output side and the base of said second transistor; and a circuit coupled in parallel with said variable source resistor, said circuit including a first resistor, a heat sensitive element and a second resistor all connected in series, the junction of said first resistor and at least one of said heat sensitive resistance element and second resistor being connected to the base of said second transistor.

8. A light sensitive amplifier circuit arrangement for detecting light comprising:

a source follower field effect transistor having at least a gate resistor coupled between its gate and ground, and a source resistor coupled between its source and ground;

a second transistor whose base is connected to the source of said field effect transistor, and whose collector is connected to a power source through a resistor;

a constant voltage supply element connected between the emitter of said second transistor and ground;

a photoconductive element connected in a negative feedback loop disposed between the gate of said field effect transistor and the output side of said second transistor;

a load coupled to the output side of said second transistor and which is driven in response to the variation of the resistance of the photoconductive element due to the intensity of incident light;

a feedback transmitting element coupled in a negative feedback loop disposed between the output side and the base of said second transistor; and at least one further resistor coupled between the power source and at least one of the gate of said field effect transistor and the base of said second transistor.

9. A light sensitive amplifier circuit arrangement according to claim 8 including a first further resistor is coupled between said power source and said gate of said field effect transistor, and a second further transistor coupled between said power source and said base of said second transistor.

10. A light sensitive amplifier circuit arrangement for detecting light comprising:

a source follower field effect transistor having at least a gate resistor coupled between its gate and ground, and a variable source resistor coupled between its source and ground;

a second transistor whose base is connected to the source of said field effect transistor, and whose collector is connected to a power source through a resistor;

a constant voltage supply element connected between the emitter of said second transistor and ground;

a photoconductive element connected in a negative feedback loop disposed between the gate of said field effect transistor and the output side of said second transistor;

a load coupled to the output side of said second transistor and which is driven in response to the variation of the resistance of the photoconductive element due to the intensity of incident light;

a circuit coupled in parallel with said variable source resistor, said circuit including a first resistor, a heat sensitive resistance element and a second resistor all connected in series, the junction of said first resistor and at least one of said heat sensitive resistance element and second resistor being connected to the base of said second transistor; and at least one further resistor coupled between the power source and at least one of the gate of said field effect transistor and the base of said second transistor.

11. A light sensitive amplifier circuit arrangement according to claim 10 including a first further resistor is coupled between said power source and said gate of said field effect transistor, and a second further transistor coupled between said power source and said base of said second transistor.

12. A light sensitive amplifier circuit arrangement for detecting light comprising:

a source follower field effect transistor having at least a gate resistor coupled between its gate and ground, and a variable source resistor coupled between its source and ground;

a second transistor whose base is connected to the source of said field effect transistor, and whose collector is connected to a power source through a resistor;

a constant voltage supply element connected between the emitter of said second transistor and ground;

a photoconductive element connected in a negative feedback loop disposed between the gate of said field effect transistor and the output side of said second transistor;

a load coupled to the output side of said second transistor and which is driven in response to tee variation of the resistance of the photoconductive element due to the intensity of incident light;

a feedback transmitting element coupled in a negative feedback loop through a resistor, said feedback transmitting element being coupled between the output side of said second transistor and ground through a resistor included in the source circuit of said field effect transistor;

a circuit coupled in parallel with said variable source resistor, said circuit including a first resistor, a heat sensitive resistor element and a second resistor all connected in series, the junction of said first resistor and at least one of said heat sensitive resistor element and second resistor being connected to the base of said second transistor; and at least one further resistor coupled between the power source and at least one of the gate of said field effect transistor and the base of said second transistor.

13. A light sensitive amplifier circuit arrangement according to claim 12 including a first further resistor is coupled between said power source and said gate of said field effect transistor, and a second further transistor coupled between said power source and said base of said second transistor.

* * * * *